United States Patent [19]
Monroe et al.

[11] Patent Number: 5,214,699
[45] Date of Patent: May 25, 1993

[54] SYSTEM FOR DECODING AND DISPLAYING PERSONALIZED INDENTIFICATION STORED ON MEMORY STORAGE DEVICE

[75] Inventors: Midori Monroe, Vancouver, Canada; George Y. Huang, Chicago; Tony D. Martin, Arlington Heights, both of Ill.

[73] Assignee: Audio Digital Imaging Inc., Arlington Heights, Ill.

[21] Appl. No.: 895,641

[22] Filed: Jun. 9, 1992

[51] Int. Cl.⁵ ............................................. H04K 1/00
[52] U.S. Cl. ......................................... 380/23; 380/25
[58] Field of Search ................................. 380/23–25; 235/379, 380, 382, 492

[56] References Cited

U.S. PATENT DOCUMENTS

| | | |
|---|---|---|
| 4,580,134 | 4/1986 | Campbell et al. . |
| 4,650,981 | 3/1987 | Foletta . |
| 4,697,072 | 9/1987 | Kawana ................... 380/23 |
| 4,745,268 | 5/1988 | Drexler . |
| 4,879,747 | 11/1989 | Leighton et al. ........... 380/23 |
| 4,926,480 | 5/1990 | Chaum ..................... 380/23 |
| 4,961,229 | 10/1990 | Takahashi . |
| 4,972,476 | 11/1990 | Nathans ................... 380/23 |
| 4,979,159 | 12/1990 | Tsuruoka et al. . |
| 4,993,068 | 2/1991 | Piosenka et al. ........... 380/23 |
| 4,995,081 | 2/1991 | Leighton et al. ........... 380/23 |
| 5,018,017 | 5/1991 | Sasaki et al. . |
| 5,027,401 | 6/1991 | Soltesz .................... 380/23 |
| 5,048,085 | 9/1991 | Abraham et al. ........... 380/25 |
| 5,053,608 | 10/1991 | Senanayake . |
| 5,057,924 | 10/1991 | Yamada et al. . |
| 5,067,029 | 11/1991 | Takahashi . |
| 5,068,744 | 11/1991 | Ito . |
| 5,168,371 | 12/1992 | Takayanagi ............... 380/23 |

Primary Examiner—Salvatore Cangialosi
Attorney, Agent, or Firm—Wood, Phillips, VanSanten, Hoffman & Ertel

[57] ABSTRACT

A fake-proof card decoding system allows for the reading of data from an EEPROM memory device. A photographic-type image is stored in the memory device. The data comprises a data table containing randomly distributed unique serialized information. This information may be the serial number of the encoding read/write terminal, or the issue number of the particular identification information created by the encoding terminal. Advantageously, the system uses color cell compression for the acquisition, digitization and compression of the photographic-type image, which may be a facial representation, fingerprint, signature, voice print, eye retina or any other unique personal identification in a compressed form which may read by the decoding system to verify the positive identification of the presenter.

20 Claims, 4 Drawing Sheets

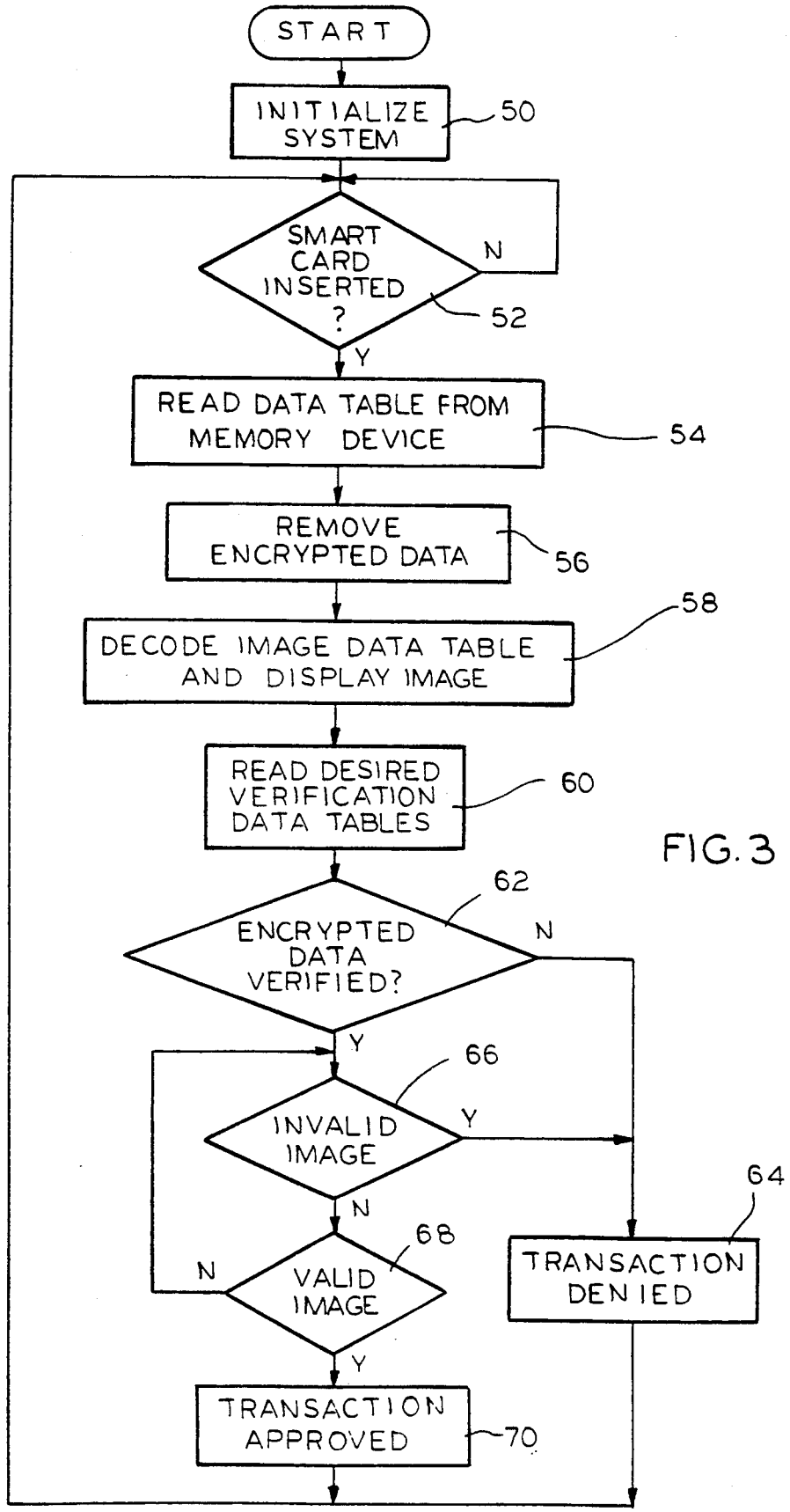

SYSTEM FOR DECODING AND DISPLAYING PERSONALIZED INDENTIFICATION STORED ON MEMORY STORAGE DEVICE

FIELD OF THE INVENTION

This invention relates to customer cards and, more particularly, to a decoding system for decoding fake-proof video information data stored on a memory storage device of such a customer card.

BACKGROUND OF THE INVENTION

Various forms of customer cards are in common use. In many instances it is readily possible to create a fake or fraudulent card which can be used to the detriment of the card issuer or an establishment accepting a card. For example, one common form of an identification card is a state issued drivers license. This card usually includes a photograph of the card holder. The photograph on a drivers license can be altered. Alternatively a fraudulent card can be made. Credit or debit cards are often used for purchases. Such cards include embossment of the card holder's name and card number. Often, these cards also includes a magnetic stripe to provide a higher level of security. However, these cards can also be easy to counterfeit. To verify transactions using such cards, it is often necessary to compare the card number to a list of fraudulent or stolen cards or by telephoning a credit card verification service.

In order to minimize fraud, certain card identification systems have been used in which a memory in some form on the card stores data representing a user's credentials, such as a photograph or fingerprint. Such systems are disclosed, for example, in Piosenka et al., U.S. Pat. No. 4,993,068 and Soltesz, U.S. Pat. No. 5,027,401. Both patents disclose a system in which a photographic representation is stored in the memory means for later retrieval at a remote site. However, it is not apparent that such systems would provide adequate protection from counterfeiting.

The present invention is directed to solving one or more of the above problems.

SUMMARY OF THE INVENTION

In accordance with the invention there is disclosed a decoding system for verifying authenticity of a personal card to provide a high level of cost effective fraud protection.

Broadly, there is disclosed herein a method of decoding fake-proof video information data from storage on a user identification card including memory means for storing such data for retrieval. The method comprises the steps of storing unique digitized system verification information, the digitized verification information comprising a desired verification data table; reading a video data table from a memory means of a user identification card, the video data table including a video information data table having elements of verification data at select distributed locations; separating the verification data from the video data table to provide the information data table; creating an actual verification data table using the separated verification data; comparing the actual verification data table to the desired verification data table to verify authenticity of the user identification card and converting the video information data table for display on a display device to verify authenticity of the user.

It is a feature of the invention that the converting step further comprises the step of decoding compressed digitized video information stored in the information data table.

In accordance with one aspect of the invention, the video data table comprises a table of N bytes of data and the separating step includes the steps of creating an offset table using the first M bytes of data, where M is less than N, the offset table defining an offset value for each of a plurality of index numbers, selecting index values using video table data and sequentially removing bytes of data from the video data table at positions related to the offset value associated with the index values.

It is another feature of the invention that the storing step comprises storing digitized system verification information identifying a unique serial number assigned to a terminal used to encode the video data table.

It is another feature of the invention that the storing step comprises storing digitized system verification information identifying an issue serial number assigned to the user identification card.

There is disclosed in accordance with another aspect of the invention a fake-proof system for reading video verification information from a user identification card, the card including memory means for storing verification information stored thereon for retrieval. The system includes means for storing unique digitized system verification information, the digitized verification information comprising a desired verification data table. Means are provided for reading a data table from a memory means of a user identification card, the video data table including a video information data table having elements of verification data at select distributed locations. Means are provided for separating the verification data from the video data table to provide the information data table and means for creating an actual verification data table using the separated verification data. Means are provided for comparing the actual verification data table to the desired verification data table to verify authenticity of the user identification card. Means are provided for converting the video information data table for displaying a video display device to verify authenticity of the user.

It is a feature of the invention to further provide means responsive to the comparing to means for indicating verification of the identification card.

Advantageously, the system uses color cell compression for the decoding of the information data table to provide a video image which may be a facial representation, fingerprint, signature, voice print, eye retina or any other unique personal identification in a compressed form to verify the positive identification of the presenter of the identification card.

Further features and advantages of the invention will readily be apparent from the specification and from the drawing.

BRIEF DESCRIPTION OF THE DRAWING

FIG. 3 is a flow chart for a program implemented by the CPU of FIG. 2 for decoding a video image data table;

FIG. 4 illustrates an exemplary encrypted video image data table read from a user identification card;

FIG. 5 illustrates the data table of FIG. 4 after encrypted verification data has been removed.

DETAILED DESCRIPTION OF THE INVENTION

In accordance with the invention, a method and system are disclosed for decoding compressed video image data stored on a memory device, the data containing randomly distributed unique serialized information which can be used for verifying authenticity of the card.

Figure 1:
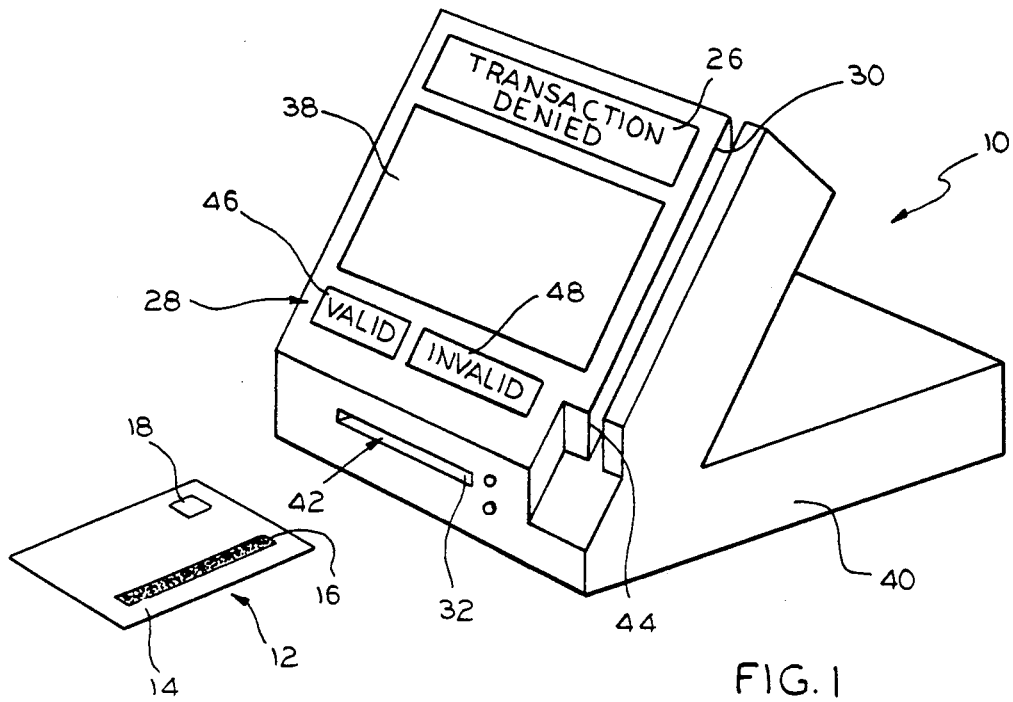
FIG. 1 is a perspective view of a decoding device in the form of a point of sale terminal used for the fake-proof system according to the invention.

With reference to FIG. 1, a point of sale terminal (POST) 10 used for performing the decoding is illustrated. The POST 10 in its most common form would be used by a seller of goods or services for executing payment transactions. For example, the POST 10 might be used as a peripheral device to a conventional cash register.

Although not specifically disclosed, the POST 10 may be used in other forms where security is required, such as a security device for enabling entry to a building or past a security check point.

Particularly, the POST 10 is used in connection with a user identification card 12. The card 12 comprises an integrated circuit card, often referred to as a "smart card". The card 12 comprises a plate 14 including a magnetic stripe 16 for magnetically storing data and an integrated circuit 18. The integrated circuit 18 comprises an EEPROM memory chip with a microprocessor.

The memory card 12 may take any known form. An example of a typical such card is illustrated and described in Foletta, U.S. Pat. No. 4,650,918. The particular type of card is not itself part of the invention other than serving as a memory storage device for storing fake-proof video information data for later retrieval.

In accordance with the invention, the card 12 stores video verification information in the memory components of the integrated circuit 18. This video verification information includes a data table storing data representing a video image for some personal characteristic of the cardholder, such as a facial photograph. The data table is encrypted with verification data used for verifying authenticity of the card. This verification data, along with the display of the image represented by the data table, can be used at the POST 10 for verifying authenticity of both the card 12 and the cardholder.

Figure 2:
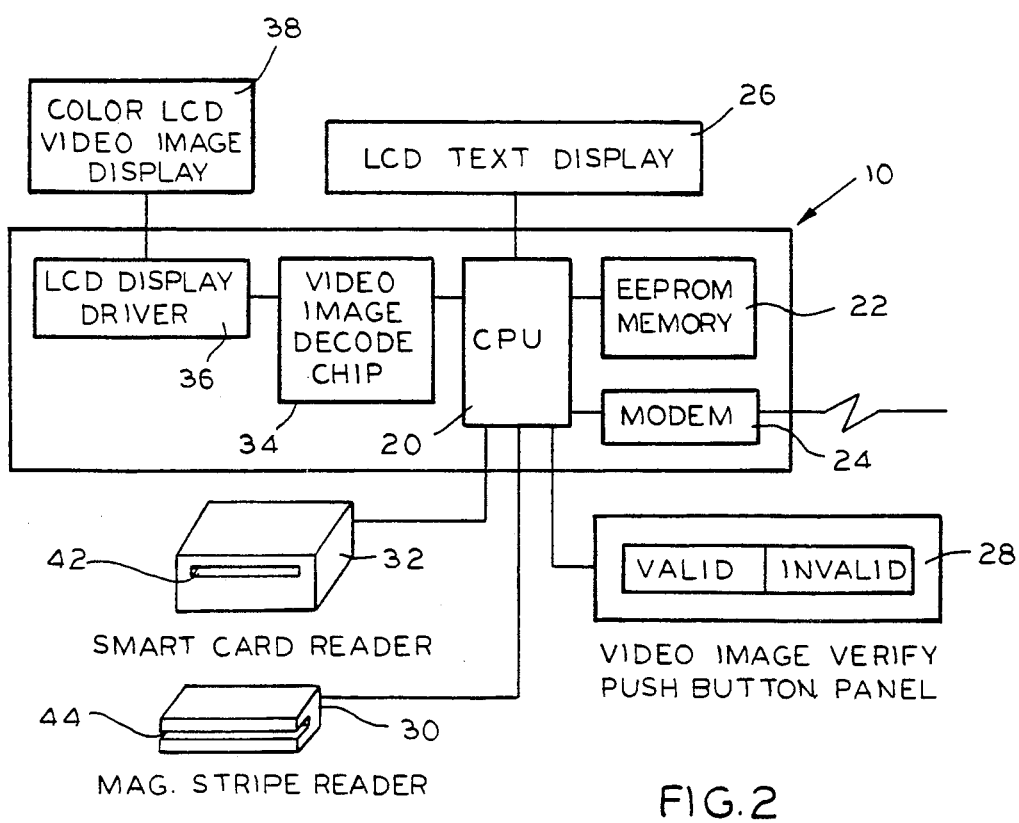
FIG. 2 is block diagram illustrating the components for the terminal of FIG. 1.

The POST 10 comprises a customized computing terminal shown in block diagram in FIG. 2. Particularly, the POST 10 includes a central processing unit (CPU) 20 connected to an EEPROM memory 22. The CPU 20 is also connected to a modem 24, an LCD text display device 26, a video image verify push button panel 28, a mag stripe reader 30, a smart card reader 32 and a video image decode chip 34. The decode chip 34 drives an LCD display driver 36 which in turn is connected to a color LCD video image display device 38.

As illustrated in FIG. 1, all components of the POST 10 are self-contained within a housing 40. Particularly, the card 12 can be inserted in a slot 42 of the smart card reader 32. The card 12 can also be pulled through a slot 44 of the mag stripe reader 30. The text display 26 can be used for displaying messages, while the image display 38 can be used for displaying, for example, a photograph of the cardholder. The push button panel 28 includes push buttons 46 and 48 labeled VALID and INVALID, respectively. The modem 24 can be used for communicating with a central host system (not shown) as necessary or desired.

In normal use, the card 12 is inserted in the slot 42 and a video image data table stored thereon is read by the CPU 20. The CPU 20 separates encrypted verification data from the read data table to provide a video information data table which is used for generating a display on the display device 38. The verification data is compared to desired verification data stored in the EEPROM memory 22 for verifying authenticity of the card. The desired verification data may, for example, be downloaded from a host system via the modem 24. The push button panel 28 is used by the terminal operator for indicating if the photographic image on the display 38 matches the cardholder to indicate that the card is either a valid card or an invalid card. Resultantly, the LCD text display device 26 provides a message to the operator indicating acceptability of the transaction.

The video image decode chip 34 may comprise a high resolution color video image acquisition and compression circuit, such as described in Frederiksen, U.S. Pat. No. 4,743,959, the specification of which is hereby incorporated by reference herein. As described therein, the system uses an encoding message in which a color image represented by luminance and chrominance components is sectored into a plurality of blocks which are separately encoded. The resulting coded data is stored in the form of a compressed file which includes the actual coded information along with a specially formatted rigid, sparse, virtual and partial (RSVP) color table. An encoding procedure involves the compression of representative data extracted from the color image by processing on the basis of a predefined data compression sequence. The encoded data can be separated so that a predesignated portion of the data represents the information needed to reproduce a mosaic which possesses sufficient clarity to allow the user to review the actual image.

The CPU 20 is operated by control program which controls the sequence of operation. This program may include conventional operating systems and other main or executive programs for controlling overall operation. These and other application programs are not described in any detail herein, as they do not relate to the inventive features of the system. With reference to FIG. 3, a flow diagram illustrates operation of a control program for decoding fake-proof photographic images stored on the integrated circuit 18 of the memory card 12, see FIG. 1.

Upon starting the decode system program, a block 50 is operative to initialize the system. A decision block 52 continuously checks the smart card reader 32 to determine if a card 12 has been inserted in the slot 42. At this point, the program may check for other functions, such as a card in the mag stripe reader 30. However, these programs are not described as they are unrelated to the inventive concepts herein.

Once a card 12 is inserted, then a block 54 reads a data table from memory circuits of the card's integrated circuit 18. As described below, the data table includes a video image or information data table encrypted with verification data. The encrypted verification data is removed at a block 56 and the image data table is decoded by the decode chip 34, see FIG. 2, and the image displayed on the display 38, also see FIG. 2, at a block 58. At a block 60 desired verification data tables are read from the memory 22. These data tables comprise data representing acceptable encrypted data to be removed from a stored image data table. At a decision block 62 the desired verification data tables are compared to an actual verification data table, comprising the removed encrypted data from block 56, to find a match. If no match is found, then a "transaction denied" message is displayed on the text display 26 at a block 64 and the routine ends as by returning to the decision block 52.

If the encrypted data is verified, as determined at the decision block 62, then a decision block 66 determines if the image displayed on the display device 38 is valid. Particularly, if the displayed image is the facial photograph of the cardholder, then the POST operator must verify a match between the displayed image and the cardholder. If the operator defines the match to be acceptable, then the VALID push button 46 is depressed. Otherwise, the INVALID push button 48 is depressed. A decision block 66 determines if the INVALID push button is depressed, and if so proceeds to the block 64 to deny the transaction. If the INVALID push button 48 is not depressed, then a decision block 68 determines if the VALID button is depressed. If not, the control loops back to the decision block 66 until one of the push buttons 46 or 48 is depressed. If the VALID push button 48 is depressed, then the text display 26 displays a "transaction approved" message at a block 70 and the routine ends as by returning to the decision block 52.

In the illustrated embodiment of the invention, transaction approval or denial is indicated on the text display 26. Alternatively, the POST 10 could provide a selective authorization signal to a related cash register, in the case of a purchasing terminal, or to a door latch in the case of an access control security system, to either allow or prevent the transaction from further proceeding, or the POST 10 could transmit the image data table to a remote guard station monitor terminal for displaying the image, to allow human intervention for the verification of the displayed image data table against a live broadcasted CCTV image from the door latch location.

Figures 4, 5:
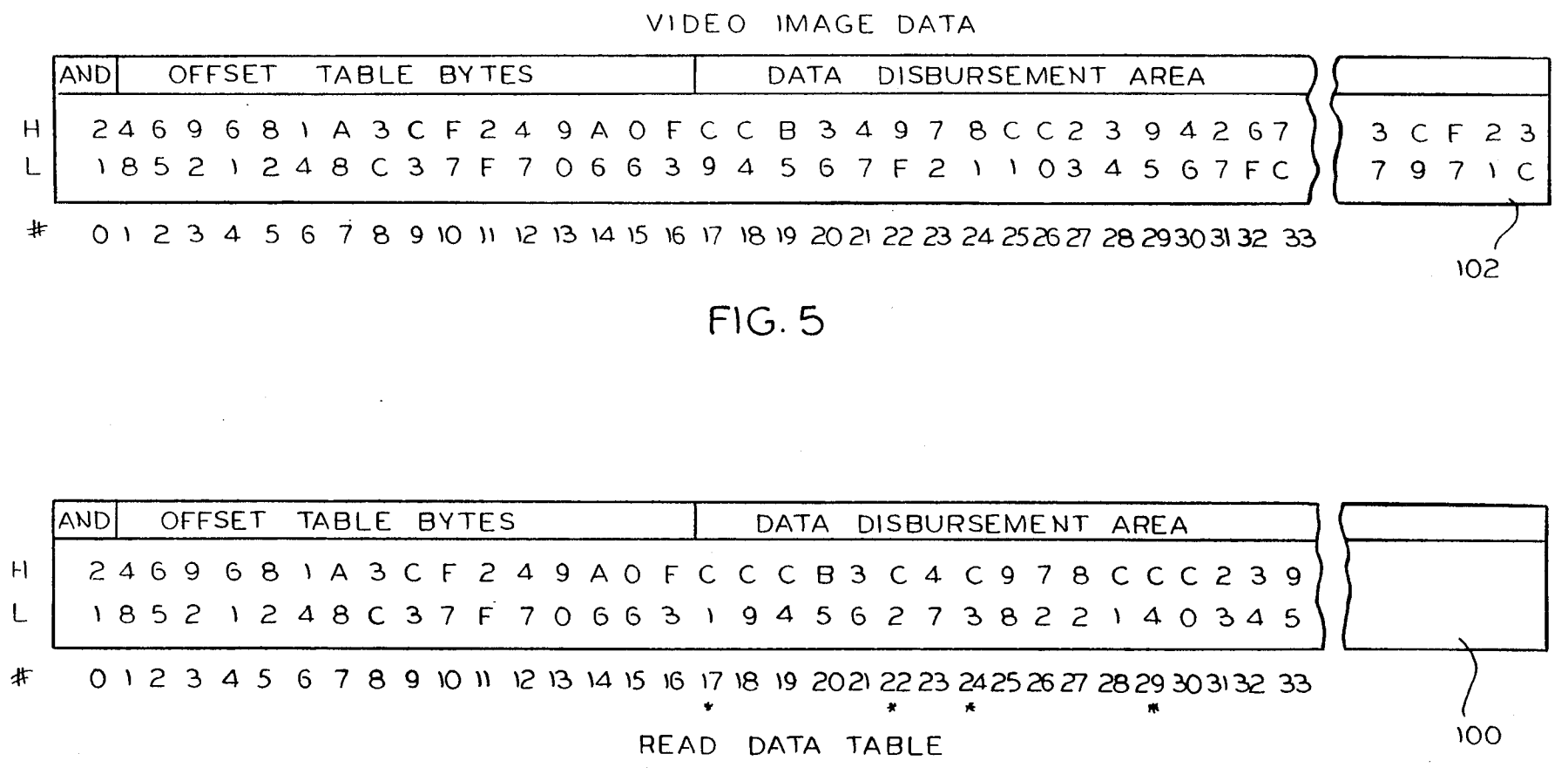

The procedure for removing encrypted data, performed at the block 56 of FIG. 3, is now described with reference to FIGS. 4 and 5. FIG. 4 illustrates a data table read from an identification card 12. This data table comprises a video information data table having elements of verification data at select distributed locations. FIG. 5 illustrates a video image data table 102 after removal of encrypted data.

Each data table 100 and 102 is represented by bytes consisting of two hex characters. The byte number is illustrated in the bottom row and the high character is shown above the low character for each byte number. Particularly, in each table 100 and 102 the byte number zero consists of the high character 2HEX and low character 1HEX.

The number of bytes in the data table 100 is dependent on the particular system requirements. The illustrated data table numbers only the first thirty-four bytes, as required for the encryption algorithm described herein below. Byte number zero is described as an AND byte, while bytes 1-16 are defined as offset table bytes. Bytes 17 on up are defined as data disbursement area bytes. Particularly, the AND byte number zero is used to AND the high and low characters along with the offset table bytes to create an offset table. The offset table is used to determine table positions at which elements of verification data are located in the data disbursement area.

Initially, the zero byte is converted to binary and the high four bits are shifted four positions and exclusive ORed with the low byte as in the following equation (1):

$$00000010B (XOR) 00000001B = 00000011B$$

The exclusive ORed result in equation (1) is then ANDed with byte numbers 1-16 to create an offset table having sixteen offset values. Each offset value is identified with an index, or IDX, number 0-15. To insure a non-zero offset value, the binary number 1 is added to the result. For example, the offset value for IDX 2, related to byte number 3, is calculated using the following equation (2):

$$\begin{aligned}(1001\ 0010B\ \text{AND}\ 0000\ 0011B) &+ 0000\ 0001B \\ = 0000\ 0010 + 0000\ 0001 &= 00000011B \\ &= 3\ \text{Dec.}\end{aligned}$$

The resultant offset table is as follows:

| OFFSET TABLE | |
|---|---|
| IDX # | OFFSET VALUE |
| 0 | 1 |
| 1 | 2 |
| 2 | 3 |
| 3 | 2 |
| 4 | 3 |
| 5 | 1 |
| 6 | 1 |
| 7 | 1 |
| 8 | 4 |
| 9 | 4 |
| 10 | 4 |
| 11 | 4 |
| 12 | 1 |
| 13 | 3 |
| 14 | 3 |
| 15 | 4 |

The offset table is used to determine the locations in the data table disbursement area at which verification data is to be removed. This verification data may be, for example, a terminal serial or identification number for the terminal (not shown) used to store the data table on the card 12. For example, a plurality of encoding terminals may be used, with each terminal having a distinct serial number. The serial number of the particular terminal is encrypted with the image data so that, when retrieved at the POST terminal 10, the serial number can be removed and compared against a table of valid serial numbers stored in the memory 22 (see FIG. 2) to insure authenticity. Alternatively, or additionally, an issue number of the particular card 12 may be encrypted. This identification number may be, for example, a user's account number or any other type of serial number which would also be stored in the master database for verification.

In the described example, four verification bytes are included in the data table 100. These bytes will be removed, as described below, to create the following verification table.

| VERIFICATION TABLE | | | |
| --- | --- | --- | --- |
| C1 | C2 | C3 | C4 |

Figure 6:
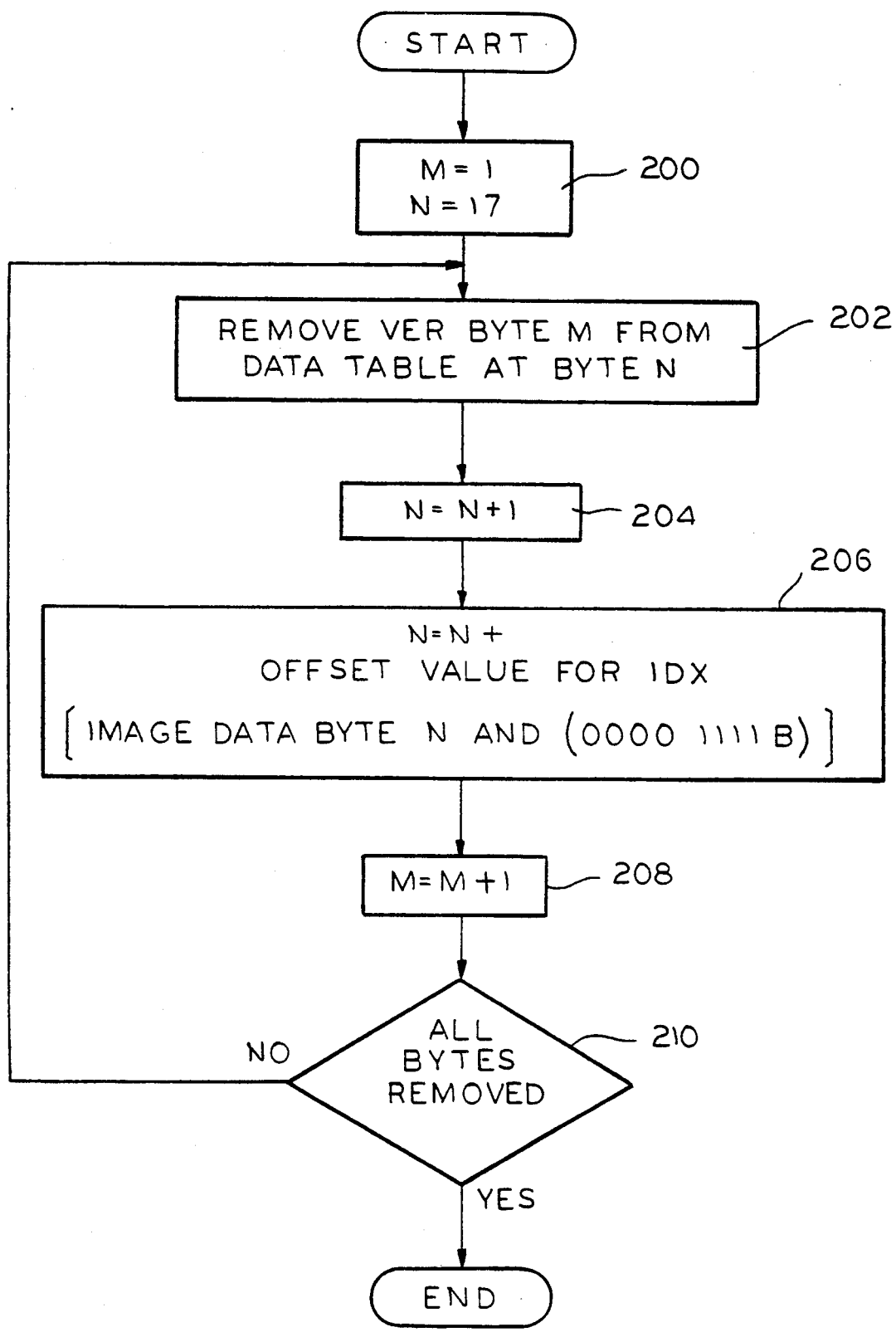
FIG. 6 is a flow chart illustrating operation of the program for performing removal of encrypted verification data.

The encrypted verification data is removed using steps illustrated in the flow diagram of FIG. 6. Removal begins at a block 200 which sets a variable M equal to 1 and N equal to 17. The variable M relates to which verification byte is being removed and the variable N is used to identify the position in the data table 100 at which the verification byte is to be removed from. N is set equal to 17 initially since the byte number 17 is the first byte in the data disbursement area. A block 202 removes the verification byte M from the data table 100 at byte N. Particularly, the first verification byte C/1 is removed from the seventeenth byte position in the data table 100. This is illustrated in the data table 100 of FIG. 4 as byte 17 having an asterisk thereunder. A block 204 increments the variable N by one. This is done because verification bytes are not inserted adjacent one another. A block 206 then adds an offset value to the variable N. The offset value is determined by calculating an IDX number by ANDing the image data for byte N with the binary character

001111B

This drops the high character from the selected N byte number to insure an IDX number between zero and fifteen. For example, initially, data byte number 18, which is C/9, is ANDed to result in the value 0/9. The offset value for IDX 9 is four. Thus, the variable N is set equal to 18+4=22. A block 208 then increments the value M. A decision block 210 determines if all verification bytes have been removed based on a preselected number stored in the memory 22, see FIG. 2. If not, then control returns to the block 202, which removes the next verification byte, in this case verification byte number 2, from the image data table at byte N, i.e., byte 22. This process continues until all verification bytes are removed from the distributed locations throughout the data dispersement area of the table 100. Particularly, the verification bytes are removed at bytes 17, 22, 24 and 29, as shown by asterisks in FIG. 4.

By using the disclosed algorithm, which relies on the first seventeen bytes in the data table 100, an encryption results which is different for each different data table stored on a memory card. Thus, it is not possible to create a counterfeit card by always inserting verification numbers at preselected locations. Instead, the locations are dependent upon the actual data contained in the data table, as described.

Thus, a fake-proof decoding system and method is described which prevents counterfeiting and results in a more secure system.

We claim:

1. A method of decoding fake-proof video information data from storage on a user identification card including memory means for storing such data for retrieval, comprising the steps of:
   storing unique digitized system verification information, said digitized verification information comprising a first verification data table;
   reading a video data table from a memory means of a user identification card, the video data table including a video information data table having elements of verification data at select distributed locations;
   separating said verification data from said video data table to provide the information data table;
   creating a second verification data table using said separated verification data;
   comparing said second verification data table to said first verification data table to verify authenticity of the user identification card; and
   converting the video information data table for display on a display device to verify authenticity of the user.

2. The method of claim 1 wherein said converting step further comprises the step of decoding compressed digitized video information stored in the information data table.

3. The method of claim 1 wherein said video data table comprises a table of N bytes of data and said separating step includes the steps of creating an offset table using the first M bytes of data, where M<N, said offset table defining an offset value for each of a plurality of index numbers, selecting index values using video table data, and sequentially removing bytes of data from the video data table at positions related to the offset values associated with the selected index values.

4. The method of claim 1 wherein said storing step comprises storing digitized system verification information identifying a unique serial number assigned to a terminal used to encode said video data table.

5. The method of claim 1 wherein said storing step comprises storing digitized system verification information identifying an issue serial number assigned to the user identification card.

6. A fake-proof system for reading verification information from a user identification card, the card including memory means for storing verification information stored thereon for later retrieval, comprising:
   means for storing unique digitized system verification information, said digitized verification information comprising a first verification data table;
   means for reading a data table from a memory means of a user identification card, the data table including an information data table having elements of verification data at select distributed locations;
   means for separating said verification data from said data table to provide the information data table;
   means for creating a second verification data table using said separated verification data;
   means for comparing said second verification data table to said first verification data table to verify authenticity of the user identification card; and
   means for converting the information data table for display on a display device to verify authenticity of the user.

7. The system of claim 6 wherein said converting means further comprises means for decoding compressed digitized video information stored in the information data table.

8. The system of claim 6 wherein said video data table comprises a table of N bytes of data and said separating means includes means for creating an offset table using the first M bytes of data, where M<N, said offset table defining an offset value for each of a plurality of index numbers, means for selecting index values using video table data, and means for removing bytes of data from the video data table at positions related to the offset values associated with the selected index values.

9. The system of claim 6 wherein said storing means stores digitized system verification information identifying a unique serial number assigned to a terminal used to encode said video data table.

10. The system of claim 6 wherein said storing means stores digitized system verification information identifying an issue serial number assigned to the user identification card.

11. The system of claim 6 wherein said reading means comprises an integrated circuit card reader.

12. The system of claim 6 wherein said display device comprises a video display operable to display video information.

13. The system of claim 6 further comprising means responsive to said comparing means for indicating verification of the identification card.

14. A fake-proof system for reading video verification information from a user identification card, the card including memory means for storing verification information stored thereon for later retrieval, comprising:
 means for storing unique digitized system verification information, said digitized verification information comprising a first verification data table;
 means for reading a video data table from a memory means of a user identification card, the video data table including a video information data table having elements of verification data at select distributed locations;
 means for separating said verification data from said video data table to provide the information data table;
 means for creating a second verification data table using said separated verification data;
 means for comparing said second verification data table to said first data table to verify authenticity of the user identification card; and
 means for converting the video information data table for display on a video display device to verify authenticity of the user.

15. The system of claim 14 wherein said converting means further comprises means for decoding compressed digitized video information stored in the information data table.

16. The system of claim 14 wherein said video data table comprises a table of N bytes of data and said separating means includes means for creating an offset table using the first M bytes of data, where $M<N$, said offset table defining an offset value for each of a plurality of index numbers, means for selecting index values using video table data, and means for removing bytes of data from the video data table at positions related to the offset values associated with the selected index values.

17. The system of claim 14 wherein said storing means stores digitized system verification information identifying a unique serial number assigned to a terminal used to encode said video data table.

18. The system of claim 14 wherein said storing means stores digitized system verification information identifying an issue serial number assigned to the user identification card.

19. The system of claim 14 wherein said reading means comprises an integrated circuit card reader.

20. The system of claim 14 further comprising means responsive to said comparing means for indicating verification of the identification card.

* * * * *